3,344,145
N-SUBSTITUTED PHENOXYALKYL OR PHENYL-
THIOALKYL-MONO AZASPIROALKANES
Charles H. Grogan, Falls Church, Va., and Leonard M.
Rice, Minneapolis, Minn., assignors to Geschickter
Fund For Medical Research, Inc., Washington, D.C.,
a corporation of the District of Columbia
No Drawing. Filed Oct. 21, 1963, Ser. No. 317,829
10 Claims. (Cl. 260—294.7)

The present invention relates to novel synthetic organic compounds having valuable pharmacological properties and, more particularly, to a novel class of N-substituted phenoxyalkyl or phenylthioalkyl (or substituted phenylthioalkyl or phenoxyalkyl) azaspiranes or 4,4-disubstituted piperidines.

It is a primary object of the present invention to provide novel synthetic organic compounds which comprise novel N-substituted phenoxyalkyl or phenylthioalkyl (or substituted phenylthioalkyl or phenoxyalkyl) azaspiranes and 4,4-disubstituted piperidines.

It is still another important object of the present invention to provide novel synthetic organic compounds having particular utility as therapeutic compounds and, more particularly, which compounds have valuable pharmacological effects on the nervous system.

These and other important objects and advantages of the present invention will become more apparent in connection with the ensuing description and appended claims.

The novel compounds of the present invention have the following general formula:

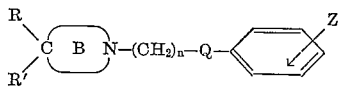

(1)

In formula (1), B is a ring containing 5–6 atoms, one of which is nitrogen (and the rest of which are preferably, though not necessarily, carbon); $n$ is a number from 1–6; Q is selected from the group consisting of sulfur and oxygen; Z is selected from at least one of the group consisting of alkyl, alkenyl, alkoxy, hydrogen, trihaloalkyl and halogen (all four); and R and R' are selected from at least one of the group consisting of alkyl, phenyl, carboxy, carboxyalkyl esters and, in combination with the carbon atom to which they are attached, a ring of at least 5 ring atoms selected from the group consisting of mono- and bicyclic rings of the formula

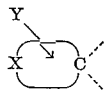

(2)

wherein X is selected from the group consisting of carbon, oxygen and sulfur (the remaining atoms of the ring preferably, but not necessarily, being carbon); and Y is selected from at least one of the group consisting of alkyl, hydrogen, alkoxy, alkenyl and cycloalkyl. There is no upper limit to the chain lengths of the R, R', Y and Z substituents but the lower (1–6) alkyl, alkenyl and alkoxy substituents are preferred. The preferred value of $n$ is 2,3 with best results obtainable when $n$ is 3. Finally, while there is no upper limit to the number of ring atoms in the X-containing ring, rings of 5–15 ring atoms are preferred.

In addition to the class of compounds embraced by formula (1), the present invention contemplates the conversion of these novel bases into non-toxic, therapeutically acceptable acid addition salts and quaternary salts. The free bases themselves are oils or low melting solids and are relatively insoluble in aqueous media and their conversion into stable, non-hygroscopic, water soluble salts renders them into medicinally useful forms for compounding, processing into pharmaceutical preparations and administration.

Generally speaking, any non-toxic, therapeutically useful acid addition salts may be employed, exemplary salts including the iodide, bromide, chloride, sulfate, acetate, phosphate, salicylate, mucate, tartrate, succinate and maleate.

The quaternary salts within the framework of the present invention have the following general formula:

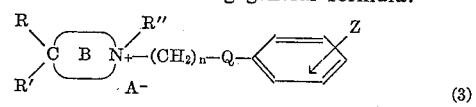

(3)

wherein R, R', ring B, $n$, Q and Z have the values indicated with respect to formula (1); $A^-$ is an anion as in the acid addition salts; and R" is selected from the group consisting of alkyl, allyl, benzyl and phenethyl. There is no particular upper limit on the chain length of R".

In the case of both the acid addition and quaternary salts, salt formation occurs on the ring B nitrogen atom.

The novel compounds of the present invention may be prepared by either of two alternative methods:

Method A.—Reaction of an azaspirane or 4,4-disubstituted piperidine with the appropriate phenoxy (or substituted phenoxy), or phenylthio (or substituted phenylthio), alkyl halide, according to the following equation:

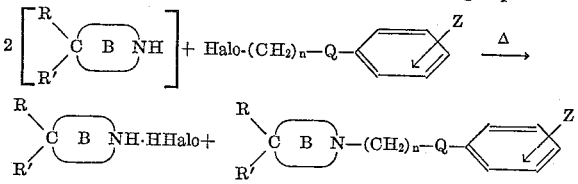

in an inert solvent such as toluene, benzene or the xylenes. Toluene is generally the most satisfactory medium. In the method as described by the above equation, two moles of the azaspirane or 4,4-disubstituted piperidine are reacted with one mole of the haloalkyl phenyl ether. One mole of the azaspirane or 4,4-disubstituted piperidine thus acts as an acid acceptor and the excess secondary amine reactant is recovered as its hydrohalide salt. In many cases, it is desired to conserve the secondary amine reactant and convert it more completely into the end product. Method A may be alternatively carried out using equimolar quantities of the two reactants shown and a molar equivalent of a hindered amine as acid acceptor. Diisopropyl ethyl amine has been advantageously employed as an acid acceptor in these synthetic procedures.

Method B.—Reaction of the appropriate phenol (or substituted phenol), or thiophenol (or substituted thiophenol), with an N-substituted haloalkyl azaspirane in the presence of alkali, as illustrated by the following equation:

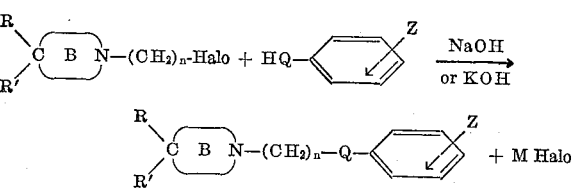

(M in the above equations represents the Na or K cation.)
Method B is advantageously carried out in alcohol. Although higher boiling alcohols (such as butyl, isoamyl, propyl) can also be employed, results are generally quite satisfactory at the reflux temperature of ethanol.

Copending application Serial No. 136,456, filed September 7, 1961, now U.S. Patent 3,238,217, issued March 1, 1966, is directed to the discovery that N-substituted aroylalkyl spiranes are extremely potent tranquilizers and that they approach or surpass in potency the phenothiazine-derived tranquilizers currently in wide usage. That is, when the portion of such spiranes corresponding to the linkage Q of the present compounds is carbonyl, extremely potent tranquilizers result. Further detailed studies on this type of structure have shown that reduction of this carbonyl group to a methylene group decreased activity. Likewise, it has been ascertained that reduction of this carbonyl group to an alcohol group also decreased activity. Insertion of an alkenylene or alkynylene group into the central alkylene chain of this type of structure similarly diminished activity. The present application is concerned with the discovery that replacement of the group Q (carbonyl in Serial No. 136,456) with an ether or thioether linkage results in useful drugs.

The compounds of the present invention, in which the group Q is an ether or thioether, are potent and valuable sedative, tranquilizing and nervous system depressant agents. More specifically, such compounds are valuable central nervous system depressants or stimulants depending upon the size and nature of the substituents on ring B, the numerical value of $n$ and the substituent Z on the phenyl group. With the optimal values of $n$ (3 or below and preferably 3), Z (preferably F) and the substituent on ring B (when such substituents form a closed ring structure), potent central nervous system depressants are obtained which possess sedative, antispasmodic and tranquilizing properties and which potentiate analgesics and narcotics. When administered to mammals (rats, mice, rabbits and human), they produce marked sedation and tranquilization in low doses and relatively low toxicity. By varying the values of $n$, Z and the substituents on ring B, pharmacological properties may be modified to obtain central nervous system stimulants. For example, with the values of $n$ and Z remaining as optimally stated above, increase in the value of $n$ above 3 gradually results in the decreasing of the depressant activity of the compounds until, when the value of $n$ is 6, a stimulant results. By the same token, variation in the value of Z (leaving the other optimally stated values as set forth above) results in a lessening of the depressant activities of the compounds and an increase in the stimulant activities of such compounds. For example, when Z is chlorine and $n$ is 6 (with the substituents on ring B being a closed ring structure), a stimulant results. With the values of $n$ and Z being as optimally stated above, the opening of the ring attached to ring B to form non-ring substituents R and R' tends to lessen the depressant activities of the compounds, those compounds with the longer chain substituents on ring B having more pronounced stimulant activity than those with shorter chains. Finally, conversion of the bases into their quaternary salts generally abolishes the depressant and tranquilizing properties of the bases and brings about formation of substances having ganglioplegic, antispasmodic and anticholinergic properties.

In general the compounds of the present invention wherein the substituents R and R' on ring B form a closed ring, as in formula (4):

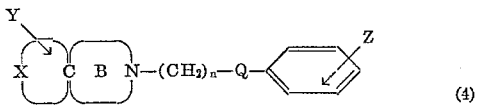

(4)

(wherein X, Y, ring B, $n$, Q and Z have the values previously defined), are much more potent, less mild and of longer duration than the compounds of the present invention wherein the substituents R and R' on ring B are non-ring substituents, as in formula (5):

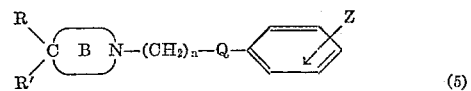

(5)

(wherein R, R', ring B, $n$, Q and Z have the values previously defined). The latter compounds are, of course, 4,4-disubstituted piperidines.

As was the case with the compounds of Serial No. 136,456, it has been found that variation of the group Z gives wide variations in the potency of the drugs. Thus, an alkoxy, alkyl, alkenyl or halogen atom gives drugs with central nervous activity. However, when fluorine is the substituent on the phenyl ring, activity is greatest. Preparation of the positional isomers (ortho, meta and para) containing the fluorine atom indicated that the para position is most effective. On the other hand, separation of the fluorine atom from the aromatic ring, such as in the use of a trifluoromethyl substituent, results in decreased activity. Oxidation of the thio ether group to a sulfone group completely eliminated depressant properties.

Merely by way of example of the administration of the compounds of the present invention, administration of the compound of Example II, 3-azaspiro[5.5]hendecane-3-[3-(p-fluoro phenoxy) propyl], hydrochloride intravenously, intramuscularly, orally, or intraperitoneally to rats, rabbits or monkeys resulted in marked sedation and "tranquilization." The toxicity of this compound was over 300 mg./kg. in the rat while the administration of 5 mg./kg. intraperitoneally resulted in marked sedation and tranquilization for a period of more than 4 hours. Administration of 10–20 mg./kg. resulted in sedation, tranquilization and, in some cases, sleep, from which the animals could be readily aroused as contrasted to the effect of barbiturates. In the monkey the effects were most pronounced. 5 mg./kg. administered intravenously produced marked sedation and "tranquilization" which persisted for more than 10 hours. Oral administration of 10–20 mg./kg. gave the same effects in about ½ hour. The compound potentiated the effects of pentobarbital sodium, meperidine and morphine sulfate in the monkey.

It is thus seen that the present invention provides a group of compounds possessing a wide variety of pharmacological properties, brought about by permutations of the basic structure within the scope of the disclosure of this invention.

The following experimental examples will illustrate the methods employed to obtain the compounds of the present invention. As will be apparent, these examples are intended to be illustrative only and are not intended to be restrictive of the scope of the present invention.

EXAMPLE I

3 - Azaspiro[5.5]undecane - 3-[2-(p-fluorophenoxy].—Refluxing 0.05 mole of p-fluorophenol with 0.05 mole 3-(2-chloroethyl)-3-azaspiro[5.5]undecane hydrochloride and with 0.1 mole of sodium hydroxide in 100 ml. of ethanol for 8 hours yielded the title compound, which was isolated as follows: The reaction mixture was cooled and filtered from sodium chloride formed during the reaction and the alcohol was distilled off at atmospheric pressure. The residue was dissolved in anhydrous ether and filtered. The ether was stripped off and the residue was distilled to yield the title compound in 92% yield (B.P. 135–145° C./0.25 mm.).

The hydrochloride.—Solution of the base obtained above in absolute ether and bubbling in gaseous hydrogen chloride gave the hydrochloride salt (M.P. 218–219° C.).

The methiodide.—Solution of the base in ether, addition of a 10% molar excess of methyl iodide and warming for 10–15 minutes gave a quantitative yield of the methonium salt (M.P. 152–3° C.).

EXAMPLE II

3 - Azaspiro[5.5]undecane - 3-[3 - (p-fluorophenoxy)-propyl].—This compound could be prepared by alternative method B from 3-(3-chloropropyl)-3-azaspiro[5.5]-undecane hydrochloride and p-fluorophenol, as illustrated in Example I. It could also be prepared by alternative method A as follows: When 0.1 mole of 3-azaspiro[5.5]-undecane and 0.05 mole of 3-bromopropyl p-fluorophenyl ether were refluxed for 24 hours in toluene, cooled and three volumes of ether added, 3-azaspiro[5.5]undecane hydrobromide separated and was removed by filtration. Stripping off the ether and toluene and vacuum distilling the residue gave the title base (B.P. 145–155° C./0.27 mm.; 88% yield). The hydrochloride was formed as in Example I (M.P. 239–240° C.). The title base could also be obtained by employing 0.05 mole of 3-azaspiro[5.5]-undecane, 0.05 mole of diisopropyl ethylamine and 0.05 mole of 3-bromopropyl p-fluorophenyl ether and refluxing in toluene as above, removal of the diisopropyl ethylamine hydrobromide by filtration, stripping and distilling as above.

Still other compounds coming within the scope of the present invention have been prepared by either alternative of Method A and Method B previously described. Some of them, with their yields and appropriate physical constants, are tabulated below:

(1) 8 - azaspiro[4.5]decane - 8 - [3 - (p - fluorophenoxy)-propyl], hydrochloride, M.P. 216–218° C.; recrystallized from acetone, M.P. 219–220° C.

(2) 2-azaspiro[4.4]nonane-2-[3-(p - fluorophenoxy)propyl], B.P. 115–120° C./0.24 mm. (75% yield); hydrochloride salt, M.P. 114–115° C.

(3) 3-azaspiro[5.5]undecane - 9 - methyl - 3 - [3 - (p-fluorophenoxy)propyl], hydrochloride, M.P. 253–5° C.; recrystallized from acetone-ethyl acetate, M.P. 258–9° C., dec.

(4) 2 - azaspiro[4.5]decane - 2 -[3 - (p - fluorophenoxy)-propyl], hydrochloride, M.P. 152–3 C.

(5) 2 - aza - 8 - oxaspiro[4.5]decane - 7,9 - dimethyl - 2-[3 - (p - fluorophenoxy)propyl], hydrochloride, M.P. 134–6° C.; recrystallized from ethyl acetate, M.P. 139–140° C.

(6) Spiro-trans-decalin - 2,4' - piperidine - 1' - [3 - (p-fluorophenoxy)propyl], hydrochloride, M.P. 260–2° C.; recrystallized from methanol-ethyl acetate, M.P. 264–5° C.

(7) 3 - azaspiro[5.6]dodecane - 3 - [3 - (p - fluorophenoxy)propyl], hydrochloride, M.P. 263-4° C.; methiodide, M.P. 174–5° C.

(8) 3 - azaspiro[5.5]undecane - 9 - tert. butyl-3-[3-(p-fluorophenoxy)propyl], hydrochloride, M.P. 272–4° C.; recrystallized from methanol-acetone, M.P. 273–4° C.

(9) 3 - azaspiro[5.5]undecane - 3 - [3 - (p - methoxyphenoxy)propyl], B.P. 155–165° C./0.075 mm.; hydrochloride salt, M.P. 218–219° C.

(10) 3 - azaspiro[5.5]undecane - 3 - [3 - (p - chlorophenoxy)propyl], B.P. 158–165° C./0.08 mm.; hydrochloride salt, M.P. 235–7° C.

(11) 1 - azaspiro[4.5]decane - 1 - [3 - (p - fluorophenoxy)propyl], hydrochloride, M.P. 161–2° C.

(12) 3 - azaspiro[5.5]undecane - 3 - [3 - (p - fluorophenylthio)propyl], B.P. 130–136° C./0.03 mm.; hydrochloride salt, M.P. 231–2° C.

(13) 3 - azaspiro[5.5]undecane - 3 - [4 - (p - fluorophenoxy)butyl], B.P. 150–160° C./0.27 mm.; hydrochloride salt, M.P. 208–9° C.; methiodide, M.P. 160–161° C.

(14) 3 - azaspiro[5.5]undecane - 3 - [5 - (p - fluorophenoxy)amyl], B.P. 150–160° C./0.24 mm.; hydrochloride salt, M.P. 234–235° C.

(15) Piperidine - 4,4 - dimethyl - 1 - [3 - (p - fluorophenoxy)propyl], B.P. 105–110° C./0.13 mm.; hydrochloride salt, M.P. 215–216° C.; methiodide, M.P. 204–5° C.

(16) Piperidine - 4,4 - diethyl - 1 - [3 - (p - fluorophenoxy)propyl], B.P. 115–120° C./0.1 mm.; hydrochloride salt, M.P. 210–211° C.; methiodide, M.P. 156–7° C.

(17) Piperidine - 4 - methyl - 4 - propyl - 1 - [3 - (p-fluorophenoxy)propyl], B.P. 120–130° C./0.22 mm.; hydrochloride salt, M.P. 234–5° C.; methiodide, M.P. 142–3° C.

(18) Piperidine - 4 - phenyl - 4 - carboethoxy - 1 - [3 - (p-fluorophenoxy)propyl], B.P. 175–185° C./0.15 mm.; hydrochloride salt, M.P. 198.5–199° C.

(19) 3- azaspiro[5.5]undecane - 3 - [3 - (m - trifluoromethylphenoxy)propyl], B.P. 130–140° C./0.2 mm.; hydrochloride salt, M.P. 224–225° C.

(20) 3 - azaspiro[5.5]undecane - 3 - [3 - (o - fluorophenoxy)propyl], B.P. 135–145° C./0.27 mm.; hydrochloride salt, M.P. 237–8° C.

(21) 3 - azaspiro[5.5]undecane - 3 - [3 - (m - fluorophenoxy)propyl], B.P. 140–150° C./0.25 mm.; hydrochloride salt, M.P. 239–240° C.

Examples of still other compounds, which may be prepared by either of Methods A or B, include:

(22) 7-methyl-2-azaspiro[4.4]nonane-2-[3-(phenoxypropyl)]

(23) 8-methyl-3-azaspiro[5.5]undecane-3-[3-(p-butoxyphenoxy)propyl]

(24) 3-azaspiro[5.5]undecane-3-[3-(p-isopropylphenoxy)propyl]

(25) 3-azaspiro[5.5]undecane-3-[3-(4-allylphenoxy)-propyl]

(26) Spirohexahydrohydrindene-[2.4']piperidine-1'-[3-(p-fluorophenoxy)propyl]

(27) 8-azaspiro[4.5]decane-8-[3-(p-isobutylphenoxy)-propyl]

(28) Piperidine-4-phenyl-4-carboxy-1-[3-(p-fluorophenoxy)propyl]

(29) Piperidine-4-phenyl-4-carbohexoxy-1-[3-(p-fluorophenoxy)propyl]

(30) 7-thia-2-azaspiro[4.4]nonane-2-[3-(p-fluorophenoxy)propyl]

(31) 2-azaspiro[4.14]nonadecane-2-[3-(p-fluorophenoxy)propyl]

(32) 9-methoxy-3-azaspiro[5.5]undecane-3-[3-(p-fluorophenoxy)propyl]

(33) 9-allyl-3-azaspiro[5.5]undecane-3-[3-(p-fluorophenoxy)propyl]

(34) 9-cyclohexyl-3-azaspiro[5.5]undecane-3-[3-(p-fluorophenoxy)propyl]

(35) 3-azaspiro[5.5]undecane-3-[3-(p-fluorophenoxy)-propyl]-3-octadecyl, iodide

(36) 3-azaspiro[5.5]undecane-3-[3-(p-fluorophenoxy)-propyl]-3-allyl, iodide

(37) 3-azaspiro[5.5]undecane-3-[3-(p-fluorophenoxy)-propyl]-3-phenethyl, bromide

(38) 3-azaspiro[5.5]undecane-3-[3-(p-fluorophenoxy)-propyl]-3-benzyl, chloride.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A compound selected from the group consisting of (1) a compound of the formula:

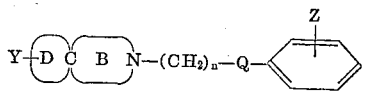

wherein B is a ring containing five to six ring atoms, one of which is nitrogen, and the rest of which are carbon; $n$ is a number from 1 to 6; Q is selected from the group consisting of sulfur and oxygen; Z is selected from the group consisting of lower alkyl, lower alkenyl, lower alkoxy, hydrogen, trihaloalkyl and halogen; and ring D is selected from the group consisting of monocarbocyclic rings having five to fifteen ring atoms including the carbon atom to which they are attached, hexahydrohydrindenyl and decahydronaphthyl; and Y is selected from the group consisting of lower alkyl, hydrogen, lower alkoxy, lower alkenyl and cycloalkyl of up to six carbon atoms; (2) a non-toxic therapeutically useful acid addition salt of compound (1); and (3) a non-toxic therapeutically useful quaternary salt of compound (1) of the formula:

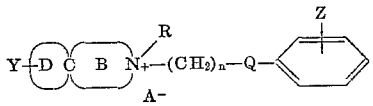

wherein ring D, ring B, $n$, Q, Z and Y have the values set forth above; $A^-$ is a pharmaceutically acceptable anion; and R is selected from the group consisting of lower alkyl, allyl, benzyl and phenethyl.

2. A compound as defined in claim 1 wherein $n$ is (3).
3. A compound selected from the group consisting of (1) a compound of the formula

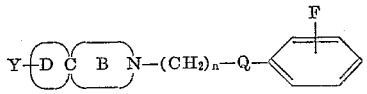

wherein B is a ring containing five to six ring atoms, one of which is nitrogen, the rest of which are carbon; $n$ is a number from 1 to 6; Q is selected from the group consisting of sulfur and oxygen; and ring D is selected from the group consisting of monocarbocyclic rings having five to fifteen ring atoms including the carbon atom to which they are attached, hexahydrohydrindenyl and decahydronaphthyl; and Y is selected from the group consisting of lower alkyl, hydrogen, lower alkoxy, lower alkenyl and cycloalkyl of up to six carbon atoms; (2) a non-toxic therapeutically useful acid addition salt of compound (1); and (3) a non-toxic therapeutically useful quaternary salt of compound (1) of the formula:

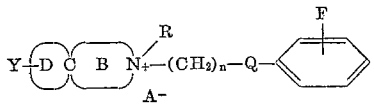

wherein ring D, ring B, $n$, Q and Y have the values set forth above; $A^-$ is a pharmaceutically acceptable anion; and R is selected from the group consisting of lower alkyl, allyl, benzyl and phenethyl.

4. A compound as defined in claim 3 wherein the fluorine atom on the phenyl ring is in the para position.
5. A compound selected from the group consisting of (1) compound of the formula:

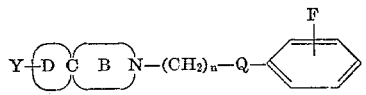

wherein B is a ring containing five to six ring atoms, one of which is nitrogen, the rest of which are carbon; $n$ is a number from 1 to 6; Q is selected from the group consisting of sulfur and oxygen; D is a monocarbocyclic ring having five to fifteen ring atoms; and Y is selected from the group consisting of lower alkyl, hydrogen, lower alkoxy, lower alkenyl and cycloalkyl of up to six carbon atoms; (2) a non-toxic therapeutically useful acid addition salt of compound (1); and (3) a non-toxic therapeutically useful quaternary salt of compound (1) of the formula:

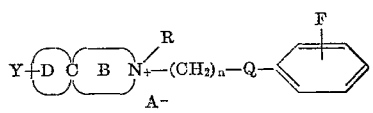

wherein ring D, Y, ring B, $n$ and Q have the values set forth above; $A^-$ is a pharmaceutically acceptable anion; and R is selected from the group consisting of lower alkyl, allyl, benzyl and phenethyl.

6. A compound as defined in claim 5 wherein the fluorine atom on the phenyl ring is in the para position.
7. A compound selected from the group consisting of (1) a compound of the formula:

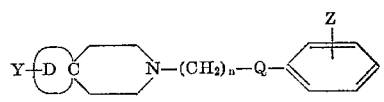

wherein $n$ is a number of from 1 to 6; Q is selected from the group consisting of sulfur and oxygen; Z is selected from the group consisting of lower alkyl, lower alkenyl, lower alkoxy, hydrogen, trihaloalkyl and halogen; ring D is a monocarbocyclic ring having five to fifteen ring atoms and Y is selected from the group consisting of lower alkyl, hydrogen, lower alkoxy, lower alkenyl and cycloalkyl of up to six carbon atoms; (2) a non-toxic therapeutically useful acid addition salt of compound (1); and (3) a non-toxic therapeutically useful quaternary salt of compound (1) of the formula:

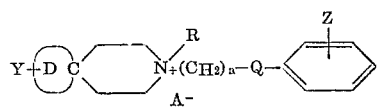

wherein ring D, Y, $n$, Q and Z have the values set forth above; $A^-$ is a pharmaceutically acceptable anion; and R is selected from the group consisting of lower alkyl, allyl, benzyl and phenethyl.

8. A compound as defined in claim 7 wherein Z is fluorine and $n$ is 3.
9. 3-azaspiro[5.5]undecane-3-[3-(p-fluorophenoxy)-propyl].
10. 3-azaspiro[5.5]undecane-3-[2-(p-fluorophenoxy)-ethyl].

References Cited

UNITED STATES PATENTS

| | | | |
|---|---|---|---|
| 2,846,437 | 8/1958 | Elpern | 260—293.4 |
| 3,117,975 | 1/1964 | Bortnick et al. | 260—293.4 |
| 3,201,401 | 8/1965 | Krapcho | 260—294.7 |
| 3,238,216 | 3/1966 | Janssen | 260—293.4 |

FOREIGN PATENTS

| | | |
|---|---|---|
| 184,968 | 5/1907 | German. |

WALTER A. MODANCE, *Primary Examiner.*

JOHN D. RANDOLPH, *Examiner.*

A. D. SPEVACK, *Assistant Examiner.*